(12) United States Patent
Lee et al.

(10) Patent No.: US 6,885,668 B1
(45) Date of Patent: Apr. 26, 2005

(54) APPARATUS FOR AND METHOD OF PROCESSING LOW-SPEED CIRCUIT DATA AND HIGH-SPEED PACKET DATA

(75) Inventors: Ho-Jin Lee, Ichon-shi (KR); Chae-Moon Lee, Seoul (KR); Duck-Young Seo, Chollabuk-do (KR); Jin-Hyung Yang, Sungnam-shi (KR)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/543,822

(22) Filed: Apr. 5, 2000

(30) Foreign Application Priority Data

Jun. 19, 1999 (KR) .............................................. 99-23093
Jun. 19, 1999 (KR) .............................................. 99-23094

(51) Int. Cl.[7] .......................................................... H04L 12/56
(52) U.S. Cl. ...................................... 370/395.1; 370/422
(58) Field of Search ................................. 370/335, 338, 370/331, 342, 320, 395, 395.1, 397, 399, 400, 409, 420, 422, 469, 470

(56) References Cited

U.S. PATENT DOCUMENTS 5,881,060 A  3/1999  Morrow et al.
6,574,221 B1 * 6/2003  Petersen .................... 370/395.1

* cited by examiner

Primary Examiner—Wellington Chin
Assistant Examiner—William Schultz
(74) Attorney, Agent, or Firm—McDonnell Boehnen Hulbert Berghoff LLP (57) ABSTRACT

Disclosed is an apparatus and a method capable of processing low-speed circuit data lower than 64 kbps and high-speed packet data higher than 64 kbps in which a high-speed data network is constructed by converting an LCIN (local CDMA (code division multiple access) interconnection network) for supplying a communication path of packet data among sub-systems in a BSC (base station controller) of CDMA system to an ATM (asynchronous transfer mode) for processing high-speed data, installing a TSB (transcoder selector bank) or an SDU (selector distribution unit) for processing high-speed packet data higher than 64 kbps in the BSC, and linking an ATM switch to an MSC (mobile switching center) to provide a high-speed data service with respect to other network. The TSB for processing voice data and low-speed data lower than 64 kbps and high-speed data higher than 64 kbps, or the TSB for processing high-speed data higher than 64 kbps is provided to the BSC, thus allowing high-speed data processing up to 2 mbps, high-speed data service, multimedia service like a video service, and high-speed Internet service.

2 Claims, 9 Drawing Sheets

APPARATUS FOR AND METHOD OF PROCESSING LOW-SPEED CIRCUIT DATA AND HIGH-SPEED PACKET DATA

BACKGROUND OF THE INVENTION

1. Field of the Invention

The present invention relates to an apparatus for and a method of processing low-speed circuit data and high-speed packet data, and more particularly, to an apparatus and a method capable of processing low-speed circuit data lower than 64 kbps and high-speed packet data higher than 64 kbps in which a high-speed data network is constructed by converting an LCIN (local CDMA (code division multiple access) interconnection network) for supplying a communication path of packet data among sub-systems in a BSC (base station controller) of CDMA system to an ATM (asynchronous transfer mode) for processing high-speed data, installing a TSB (transcoder selector bank) or an SDU (selector distribution unit) for processing high-speed packet data higher than 64 kbps in the BSC, and linking an ATM switch to an MSC (mobile switching center) to provide a high-speed data service with respect to other network.

2. Description of the Related Art

Figure 1:
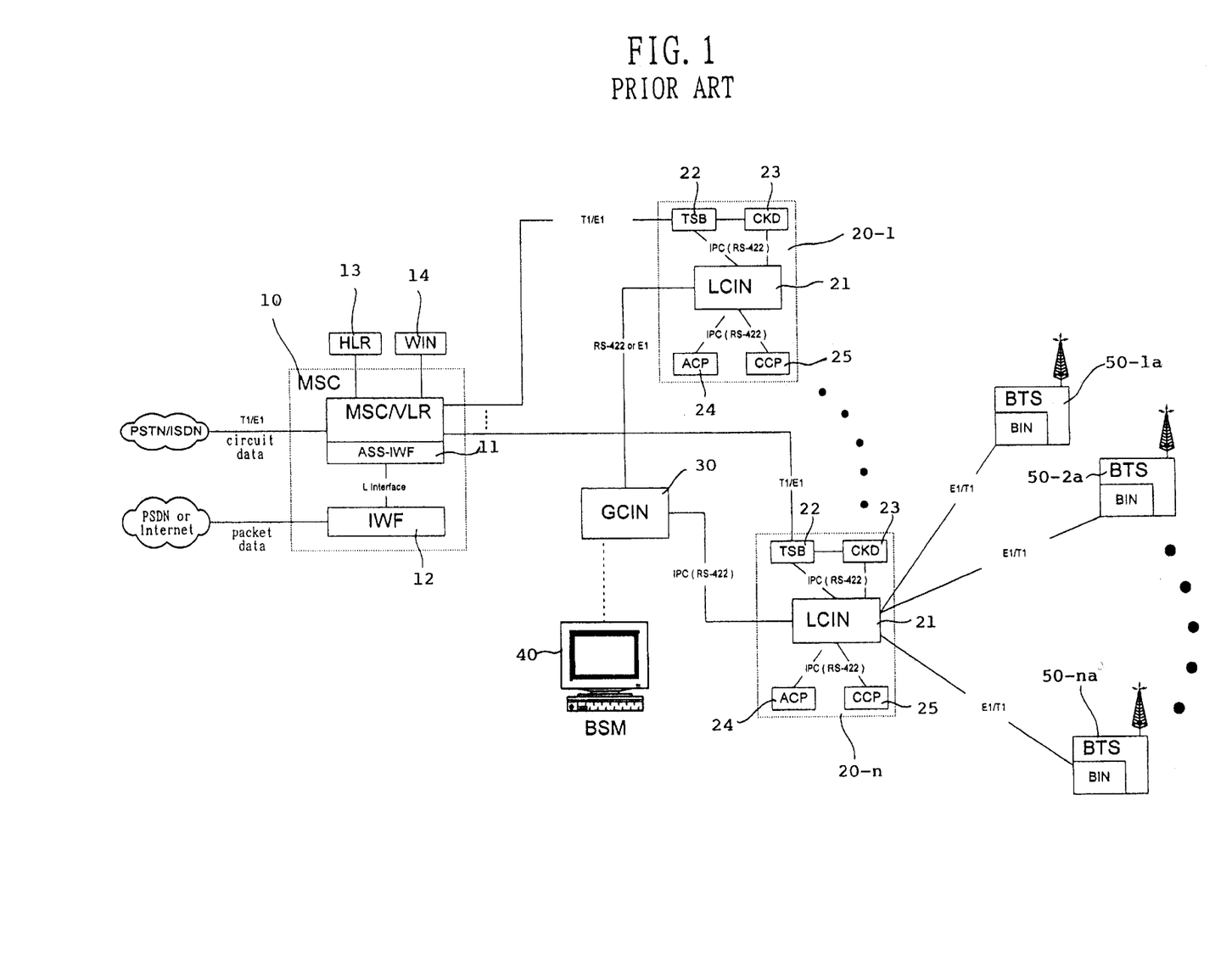
FIG. 1 is a block diagram illustrating a conventional apparatus for processing low-speed data in IS-95A system.

FIG. 1 is a block diagram illustrating an apparatus for processing voice data and low-speed packet data in a conventional IS-95A system.

As shown in FIG. 1, an apparatus for processing voice data and low-speed packet data in a conventional IS-95A system includes BIN (BTS interconnection network) 50-1a to 50-na for providing a communication path among each block in each BTS (base station transceiver subsystem) 50-1 to 50-n, an LCIN 21 connected to the BIN 50-1a to 50-na so as to provide a communication path among each block in BSC 20-1 to 20-n, a TSB (Transcoder Selector Bank) 22 connected to the LCIN 21 so as to process voice data and circuit data lower than 64 kbps, a CKD (clock distributor) 23 connected to the LCIN 21 and TSB 22 so as to convert a clock received from BSC-GPS and distributes synchronous signals to each block in the BSCs 20-1 to 20-n, an ACP 24 for collecting alarm state of each block in BSCs 20-1 to 20-n, a CCP (call control processor) 25 connected to the LCIN 21 so as to perform a call handling control function of BSCs 20-1 to 20-n, a GCIN (global CDMA interconnection network) 30 connected to the LCIN 21 so as to provide a communication path among BSCs 20-1 to 20-n, a BSM 40 connected to the GCIN 30 so as to perform such functions as BSC and BTS operation, source management, state management, user interface and maintenance and the like, an MSC/VLR 11 connected to the TSB 22 so as to function as a switch for voice data and other data, and an IWF 12 connected to the MSC/VLR 11 so as to process packet data.

Thus-configured apparatus for processing low-speed data in a conventional IS-95A system operates as follows.

When a mobile station (MS) provides one of BTSs 50-1 to 50-n with voice data or low-speed circuit data lower than 64 kbps, one of BINs 50-1a to 50-na in BTSs 50-1 to 50-n provides the LCIN 21 in BSCs 20-1 to 20-n with so-provided voice or low-speed circuit data. The LCIN 21 again provides the TSB 22 with the voice or low-speed circuit data.

The TSB 22 performs 8 k/13 kbps QCELP modulation onto thus-provided voice data, and provides the MSC 10 with the result. Alternately, the TSB 22 aligns the low-speed circuit data to 64 kbps and provides the MSC 10 with thus-aligned low-speed circuit data. The MSC 10 transmits thus-provided voice data or low-speed data of 64 kbps to a PSTN (public switched telephone network).

In the meantime, if the MS provides one of BTSs 50-1 to 50-n with low-speed packet data lower than 64 kbps, thus-provided low-speed packet data is provided again sequentially to the BIN 50-1a to 50-na, LCIN 21, TSB 22, and MSC 10. Thus-provided low-speed packet data is processed by the IWF 12, and the MSC 10 transmits the result to a PSDN (packet switched data network) or Internet.

The apparatus for processing low-speed data in a conventional IS-95A system has disadvantages.

First, a conventional TSB performs 8 k/13 k QCELP modulation onto PCM voice data of 64 kbps and transmits the result to an LCIN. Alternatively, the TSB receives only the traffic data lower than 64 kbps and bypasses the same to the LCIN. Therefore, such an operation causes no problem in IS-95A (DCS/PCS) system which supports service for data of 9.6 kbps. However, a problems arises when it comes to IS-200 system supporting service for data up to 2 mbps, as shown in the following Table 1.

TABLE 1

| System | IS-95A | IS-95B | IS-2000(1x) | 1S-2000(3x) |
|---|---|---|---|---|
| Data rate | 9.6 kbps | ~64/115 kbps | ~307.2 kbps | ~2 mbps |
| Frequency | 1.25 MHz | 1.25 MHz | 1.25 MHz | 1.25/5 MHZ |

Second, routing capacity of the conventional GCIN and LCIN is 187 mbps, respectively, which is appropriate for supporting IS-95A system but is not sufficient for supporting IS-2000 system. When IS-2000 system is operated by such insufficient GCIN and LCIN routing capacity, a bottleneck may occur, thus causing problems in processing voice data which requires a real-time service.

This can be described in more detail as follows.

To calculate GCIN routing capacity and LCIN routing capacity, a single GCIN is connected to 12 BSCs, and a single LCIN has a channel where 960 voice-coder channels and 96 H.S. data channels are combined. In addition, a fixed traffic packet data made up of 22-byte voice data, low-speed data and 756-byte high-speed data is applied. A common handoff rate of 40%, and an inter-BSC soft handoff rate of 40% are applied. As a control packet, 5% of the traffic packet is applied, and the soft handoff rate of high-speed data channel is applied.

Those reference values are applied to the following Equations (1) and (2), and GCIN capacity and LCIN routing capacity are calculated, as shown in the following Table 2.

GCIN routing capacity={number of BSCs*number of voice-coder channels*soft handoff rate*inter-BSC soft handoff rate*(traffic transmission rate+control transmission rate)}+

{number of BSCs*number of high-speed data channels*soft handoff rate*inter-BSC soft handoff rate*(high-speed data transmission rate+control transmission rate)} <Equation 1>

LCIN routing capacity={number of voice-coder channels*(1+handoff rate)*(traffic transmission rate+control transmission rate)}+{number of high-speed data channels*(1+handoff rate)*(high-speed data transmission rate+control transmission rate)} <Equation 2>

TABLE 2

| Routing capacity | GCIN | LCIN |
| --- | --- | --- |
| IS-95A | 89.51 mbps | 65.26 mbps |
| IS-2000(1×) | 364.1 mbps | 265.5 mbps |

A third disadvantage of the conventional low-speed data processing apparatus in IS-95A system is that soft handoff with BSC of other manufacturer may not be performed due to an IPC communication, i.e., modified HDLC format packet communication protocol, performed in the conventional IS-95A system.

Fourth, in the conventional IS-95A system, a connection between internal blocks is by mode U-LINK (10M, 5M, 2.5M, 1.25M), a communication system is HDLC, and a connection to MSC or BTS supports E1/T1. (2.048M/1.544M). In addition, GCIN provides 104 U-LINK ports in maximum, and LCIN provides 96 U-LINK ports and 112 E1/T1 ports in maximum.

Such a number of interface ports or port speed is sufficient to support IS-95A system, however, a port speed and number of ports for transmitting high-speed data are required in IS-2000 where a routing capacity and transmission rate per channel increase.

SUMMARY OF THE INVENTION

Therefore, it is a first object of the present invention to provide an apparatus for processing high-speed data in IS-2000 system in which a BIN (BTS interconnection network) for providing a communication path among each block in each BTS (base station transceiver subsystem), an LCIN (local CDMA interconnection network) for providing a communication path of data among subsystems in a BSC (base station controller), and a GCIN (global CDMA interconnection network) for providing a communication path among BSCs are converted to ATM (asynchronous transfer mode) switching systems, respectively, for processing high-speed data, a TSB (transcoder selector bank) for processing voice data and low-speed data lower than 64 kbps and high-speed data higher than 64 kbps is provided in the BSC, and an ATM switch for providing a high-speed multimedia service with respect to other network is added to an MSC (mobile switching center).

It is a second object of the present invention to provide an apparatus for processing high-speed data in IS-2000 system in which a BIN for providing a communication path among each block in each BTS, an LCIN for providing a communication path of data among subsystems in a BSC, and a GCIN for providing a communication path among BSCs are converted to ATM switching systems, respectively, for processing high-speed data, the GCIN performs soft handoff among BSCs, a TSB for processing high-speed data higher than 64 kbps is added to the BSC, and an ATM switch for providing a high-speed multimedia service with respect to other network is added to an MSC.

It is a third object of the present invention to provide an apparatus for processing high-speed data in IS-2000 system in which a BIN for providing a communication path among each block in each BTS, an LCIN for providing a communication path of data among subsystems in a BSC, and a GCIN for providing a communication path among BSCs are converted to ATM switching systems, respectively, for processing high-speed data, a TSB for processing high-speed data higher than 64 kbps is added to the BSC, the TSB and the GCIN are linked to perform soft handoff among BSCs and a high-speed data service, and an ATM switch for providing a high-speed multimedia service with respect to other network is added to an MSC.

It is a fourth object of the present invention to provide an apparatus for processing high-speed data in IS-2000 system in which a BIN for providing a communication path among each block in each BTS, and an LCIN for providing a communication path of data among subsystems in a BSC are converted to ATM switching systems, respectively, for processing high-speed data, a TSB for processing high-speed data higher than 64 kbps is added to a BSC, an ATM switch for providing high-speed multimedia service with respect to other network is added to an MSC, and a BSM for performing a maintenance of a BS system is connected to the ATM switch.

It is a fifth object of the present invention to provide an apparatus for processing low-speed circuit data and high-speed packet data in IS-2000 system in which an LCIN for providing a communication path of packet data among subsystems in a BSC in a CDMA system is converted to an ATM switching system for processing high-speed data, an SDU for processing high-speed packet data higher than 64 kbps is added to the BSC, and an ATM switch is linked to an MSC so as to provide a high-speed data service with respect to other network, thus constructing a high-speed data network so as to process circuit data lower than 64 kbps and packet data higher than 64 kbps.

To accomplish the first object of the present invention, there is provided an apparatus for processing high-speed packet data according to a first embodiment of the present invention, the apparatus including: a BIN adopting an ATM switching system for providing a high-speed communication path among each block in each BTS; an LCIN adopting an ATM switching system connected to the BIN so as to provide a high-speed communication path among each block in each BSC; a TSB connected to the LCIN so as to process voice data and low-speed data lower than 64 kbps and high-speed data higher than 64 kbps, respectively; a GCIN adopting an ATM switching system connected to the LCIN so as to provide a high-speed communication path among each BSC; a BSM connected to the GCIN so as to perform an overall operation of the BSC and BTS, source management, state management, user interface and maintenance; an MSC connected to the TSB so as to function as a switch for voice data and other data of an overall system; an ATM switch connected to the MSC so as to provide a high-speed multimedia service with respect to other network; and an IWF connected to the ATM switch so as to process packet data.

To accomplish the second object of the present invention, there is provided an apparatus for processing high-speed packet data according to a second embodiment of the present invention, the apparatus including: a BIN adopting an ATM switching system for providing a high-speed communication path among each block in each BTS; an LCIN adopting an ATM switching system connected to the BIN so as to provide a high-speed communication path among each block in each BSC; a first TSB connected to the LCIN so as to process voice data and low-speed data lower than 64 kbps; a second TSB connected to the LCIN so as to process high-speed data higher than 64 kbps; a GCIN adopting an ATM switching system connected to the LCIN so as to provide a high-speed communication path among each BSC; a BSM connected to the GCIN so as to perform an overall operation of the BSC and BTS, source management, state management, user interface and maintenance; an MSC connected to the first TSB so as to function as a switch for voice data and other data of an overall system; an ATM switch connected to the MSC so as to provide a high-speed multimedia service with respect to other network; and an IWF connected to the ATM switch so as to process packet data.

To accomplish the third object of the present invention, there is provided an apparatus for processing high-speed packet data according to a third embodiment of the present invention, the apparatus including: a BIN adopting an ATM switching system for providing a high-speed communication path among each block in each BTS; an LCIN adopting an ATM switching system connected to the BIN so as to provide a high-speed communication path among each block in each BSC; a first TSB connected to the LCIN so as to process voice data and low-speed data lower than 64 kbps; a second TSB connected to the LCIN so as to process high-speed data higher than 64 kbps; a GCIN adopting an ATM switching system connected to an ATM switch and the LCIN so as to perform soft handoff among each BSC and which is connected to the second TSB so as to process high-speed data; a BSM connected to the GCIN so as to perform an overall operation of the BSC and BTS, source management, state management, user interface and maintenance; an MSC connected to the first TSB so as to function as a switch for voice data and other data of an overall system; an ATM switch connected to the MSC so as to provide a high-speed multimedia service with respect to other network; and an IWF connected to the ATM switch so as to process packet data.

To accomplish the fourth object of the present invention, there is provided an apparatus for processing high-speed packet data according to a fourth embodiment of the present invention, the apparatus including: a BIN adopting an ATM switching system for providing a high-speed communication path among each block in each. BTS; an LCIN adopting an ATM switching system connected to the BIN and an ATM switch so as to provide a high-speed communication path among each block in each BSC; a first TSB connected to the LCIN so as to process voice data and low-speed data lower than 64 kbps; an MSC connected to the first TSB so as to function as a switch for voice data and other data of an overall system; an ATM switch connected to the MSC so as to provide a high-speed multimedia service with respect to other network; an IWF connected to the ATM switch so as to process packet data; a second TSB connected to the LCIN and the ATM switch so as to process high-speed data higher than 64 kbps; and a BSM connected to the ATM switch so as to perform an overall operation of the BSC and BTS, source management, state management, user interface and maintenance.

To accomplish the fifth object of the present invention, there is provided an apparatus for processing low-speed circuit data and high-speed packet data according to a fifth embodiment of the present invention, the apparatus including: a BIN adopting an ATM switching system for providing a communication path among each block in each BTS; an LCIN adopting an ATM switching system connected to the BIN so as to provide a communication path among each block in each BSC; a TSB connected to the LCIN so as to process voice data and low-speed data lower than 64 kbps; an SDU connected to the LCIN so as to process high-speed packet data higher than 64 kbps for use in a video service, PSDN, or Internet service; an MSC connected to the TSB so as to function as a switch for voice data and other data of an overall system; and an ATM switch linked to other network so as to provide a high-speed multimedia service with respect to other network, and which is linked to a PSTN via the MSC, and to a PSDN or Internet via an IWF.

To accomplish the fifth object of the present invention, there is provided a method of processing low-speed circuit data according to a sixth embodiment of the present invention, the method including: a first step of transmitting low-speed circuit data lower than 64 kbps transmitted from an MS via a BIN (ATM), from an LCIN (ATM) to a TSB in accordance with a path which is determined by an option when a call is set; and a second step of aligning by the TSB the transmitted low-speed circuit data to 64 kbps and transmitting the low-speed circuit data of 64 kbps to a PSTN via an MSC.

To accomplish the fifth object of the present invention, there is provided a method of processing image data which is high-speed packet data higher than 64 kbps according to a seventh embodiment of the present invention, the method including: a first step of transmitting image data transmitted from an MS via a BIN (ATM), from an LCIN (ATM) to an SDU in accordance with a path which is determined by an option when a call is set; a second step of transmitting the image data from the SDU to an ATM switch in accordance with a path determined by the option when the call is set; and a third step of transmitting the image data to an ATM switch of other network in case of multimedia service where the image data is transmitted from the ATM switch to other network, and transmitting the image data to a corresponding MS via the SDU, LCIN (ATM) and BIN (ATM) in case where the image data is transmitted to a subscriber of own network.

To accomplish the fifth object of the present invention, there is provided a method of processing high-speed packet data higher than 64 kbps for use in a PSDN or Internet service according to the seventh embodiment of the present invention, the method including: a first step of transmitting image data transmitted from an MS via a BIN (ATM), from an LCIN (ATM) to an SDU in accordance with a path which is determined by an option when a call is set; a second step of transmitting the image data from the SDU to an ATM switch in accordance with the path determined by the option when the call is set; and a third step of transmitting the image data to a PSDN or Internet via an IWF according to service type.

To accomplish the fifth object of the present invention, there is provided a method of processing high-speed packet data made up of voice and other data according to an eighth embodiment of the present invention, the method including: a first step of transmitting packet data made up of voice data lower than 64 kbps and data of higher than 64 kbps transmitted from an MS in a single packet, from an LCIN (ATM) to an SDU; and a second step of dividing the packet data transmitted to the SDU into voice data and other data, transmitting voice data lower than 64 kbps to a TSB for processing voice data via the LCIN (ATM), and transmitting voice data higher than 64 kbps directly to an ATM switch.

BRIEF DESCRIPTION OF THE DRAWINGS

The present invention will become more fully understood from the detailed description given hereinafter accompanying drawings, which are given by way of illustration only, and thus are not limitative of the present invention, and wherein.

PREFERRED EMBODIMENTS OF THE PRESENT INVENTION

The present invention will be explained in more detail with reference to the attached drawings.

Figure 2:
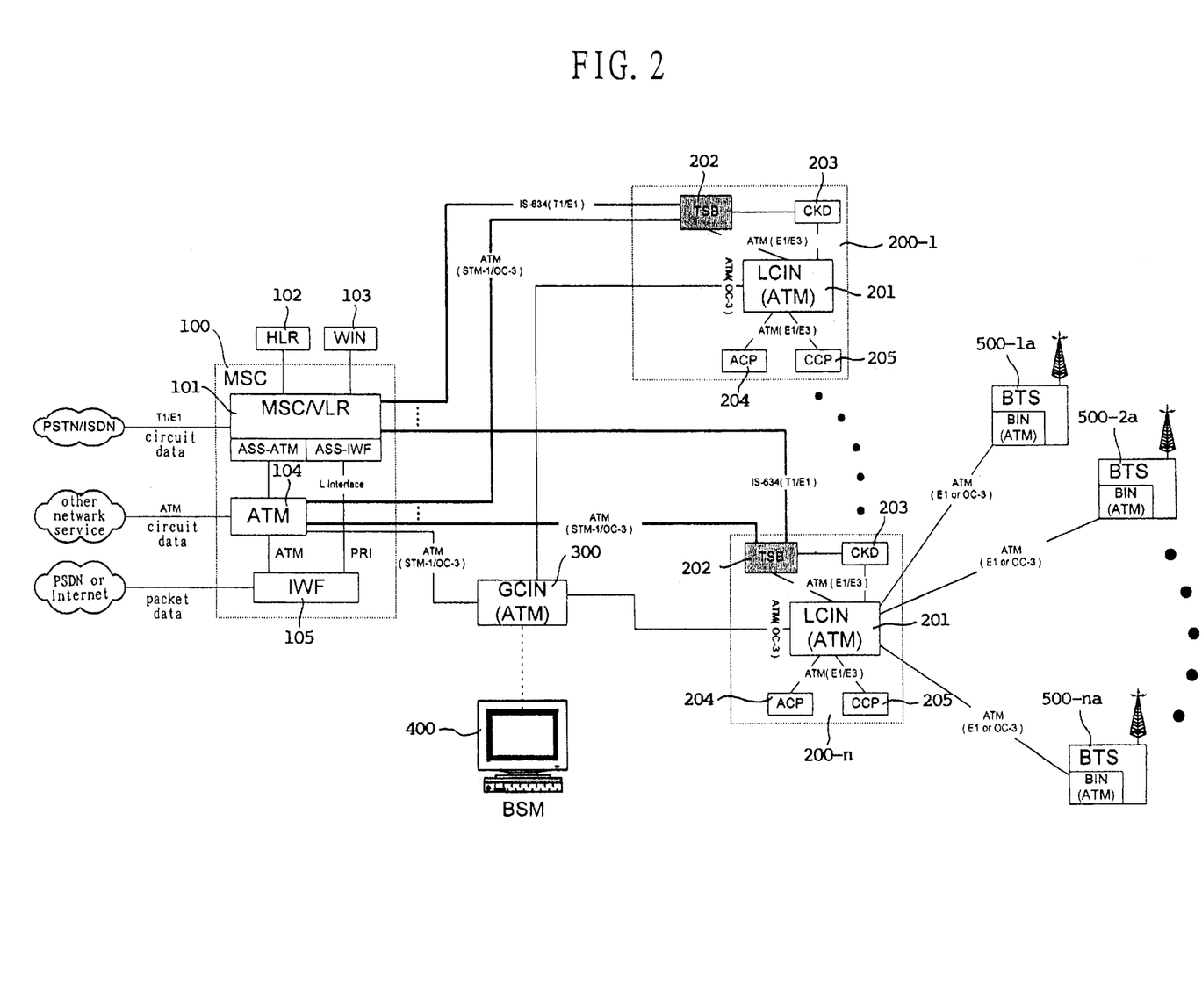
FIG. 2 is a block diagram illustrating an apparatus for processing high-speed packet data according to the first embodiment of the present invention.

FIG. 2 is a block diagram illustrating an apparatus for processing high-speed data in IS-2000 system according to the first embodiment of the present invention.

Referring to FIG. 2, an apparatus for processing high-speed packet data in IS-2000 system includes BINs (ATM) 500-1a to 500-na adopting an ATM switching system for providing a high-speed communication path among each block in each BTS 500-1 to 500n, an LCIN (ATM) 201 connected to BINs (ATM) 500-1a to 500-na so as to provide a high-speed communication path among each block in each BSC 200-1 to 200-n, a TSB 202 connected to the LCIN (ATM) 201 so as to process voice data and low-speed data lower than 64 kbps and high-speed data higher than 64 kbps, a CKD 203 connected to the LCIN (ATM) 201 and TSB 202 so as to convert a clock received from a BSC-GPS and distribute synchronous signals to each block in each BSC 200-1 to 200-n, an ACP 204 which collects alarm state of each block in BSC 2001 to 200-n, a CCP 205 connected to the LCIN (ATM) 201 so as to perform a call processing control function for BSCs 200-1 to 200-n, a GCIN (ATM) 300 connected to the LCIN (ATM) 201 so as to provide a high-speed communication path among BSCs 200-1 to 200-n, a BSM 400 connected to the GCIN (ATM) 300 so as to perform an overall operation of BSC and BTS, source management, state management, user interface and maintenance, an MSC/VLR 101 connected to the TSB 202 so as to function as a switch for voice data and other data throughout the system, an ATM switch 104 linked to the MSC/VLR 101 so as to provide a high-speed multimedia service with respect to other network, and an IWF 105 connected to the ATM switch 104 so as to process packet data.

Thus-configured apparatus for processing high-speed data in IS-2000 system according to the first embodiment of the present invention operates as follows.

When an MS provides BIN of one of BTSs 500-1 to 500-n with high-speed data of 64 kbps, the BIN again provides the high-speed data to the LCIN (ATM) 201 in BSCs 200-1 to 200-n.

The LCIN (ATM) 201 provides the TSB 202 with the high-speed data in accordance with a path determined by a service option when a call is set, and the TSB 202 processes the high-speed data and provides the ATM switch 104 with the processed data according to the path determined by the service option when the call is set. Here, if the TSB 202 is provided with low-speed data lower than 64 kbps, the TSB 202 processes the low-speed data and transmits the result to the MSC/VLR 101, so that the low-speed data can be transmitted to a PSTN via the MSC/VLR 101.

The ATM switch 600 provides an ATM switch of other network with image data in case of a multimedia service where the high-speed data is transmitted to other network.

When packet data for use in PSDN or Internet service which is higher than 64 kbps is transmitted to BINs (ATM) 500-1a to 500-n, LCIN 201, TSB 202, and ATM switch 104, the packet data for use in PSDN or Internet service is provided to an IWF 700 by the ATM switch 104. The IWF 105 transmits thus-transmitted packet data to PSDN or Internet according to service type.

The apparatus for processing high-speed data in IS-2000 system according to the first embodiment of the present invention has advantage in that voice data and low-speed data lower than 64 kbps and high-speed data higher than 64 kbps may be processed in a single TSB. Thus, the voice data and other data may be transmitted in a separate path.

In the meantime, since a single TSB processes high-speed data, the TSB becomes to be heavily loaded.

Figure 3:
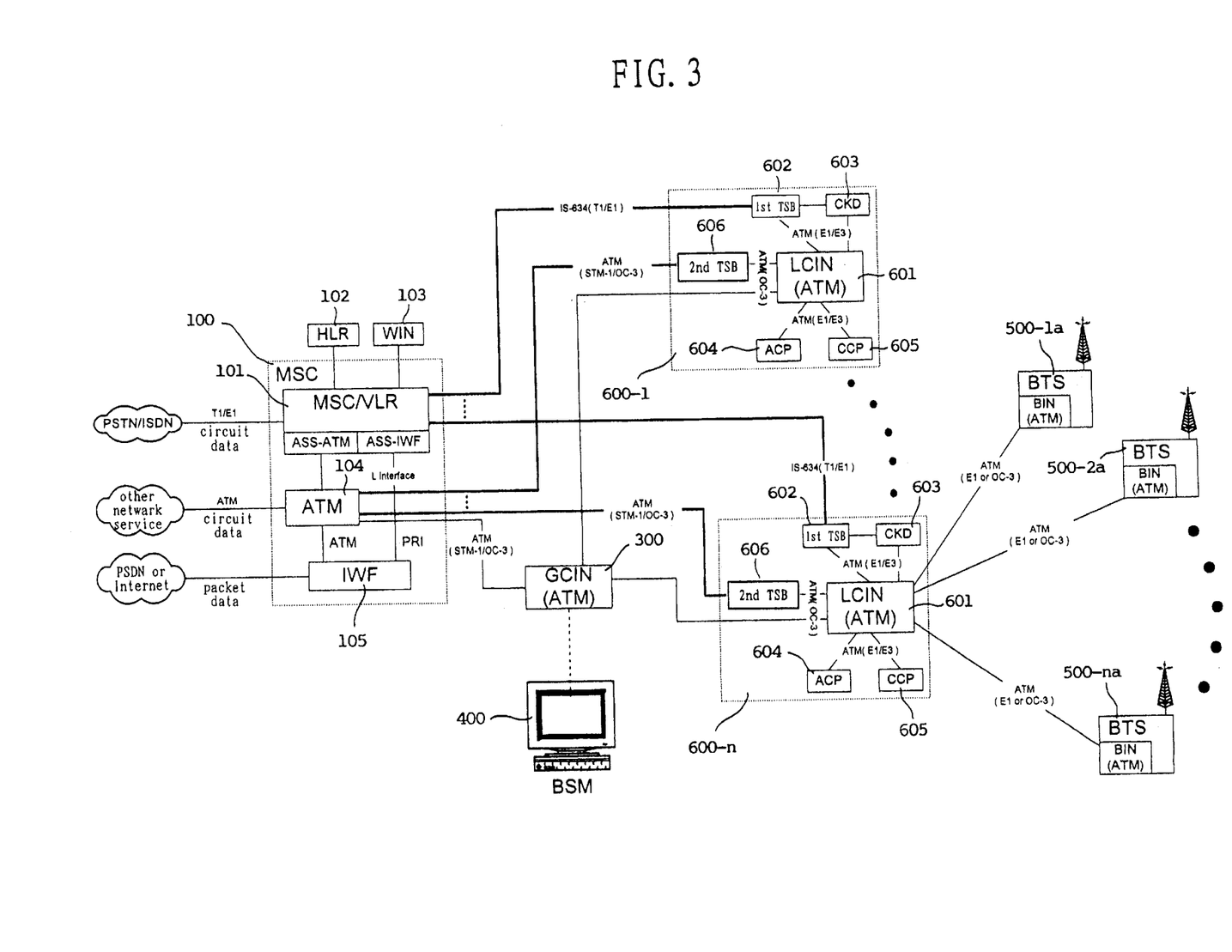
FIG. 3 is a block diagram illustrating an apparatus for processing high-speed packet data according to the second embodiment of the present invention.

FIG. 3 illustrates an apparatus for processing high-speed data in IS-2000 system according to the second embodiment of the present invention.

Referring to FIG. 3, the apparatus for processing high-speed data in IS-2000 system according to the second embodiment of the present invention has BSCs 600-1 to 600-n which are constituted by adding a second TSB 606 for processing only high-speed data higher than 64 kbps to each BSC 200-1 to 200-n of the first embodiment. Other components of the second embodiment of the present invention are structured similarly to that of the first embodiment, and the same reference numerals are used. Therefore, detailed description thereof will be omitted.

The apparatus for processing high-speed data in IS-2000 system according to the second embodiment of the present invention has advantage in that the second TSB 606 is added to each BSC 600-1 to 600-n so as to separately process high-speed data of 64 kbps, thus allowing use of a conventional TSB by modifying only an interface portion thereof. In addition, the second TSB 606 for processing only high-speed data is provided so that the first and second TSBs may relieve each other's load.

However, a difficulty is that the voice data processed in the second TSB has to be sent to the first TSB for another process.

Figure 4:
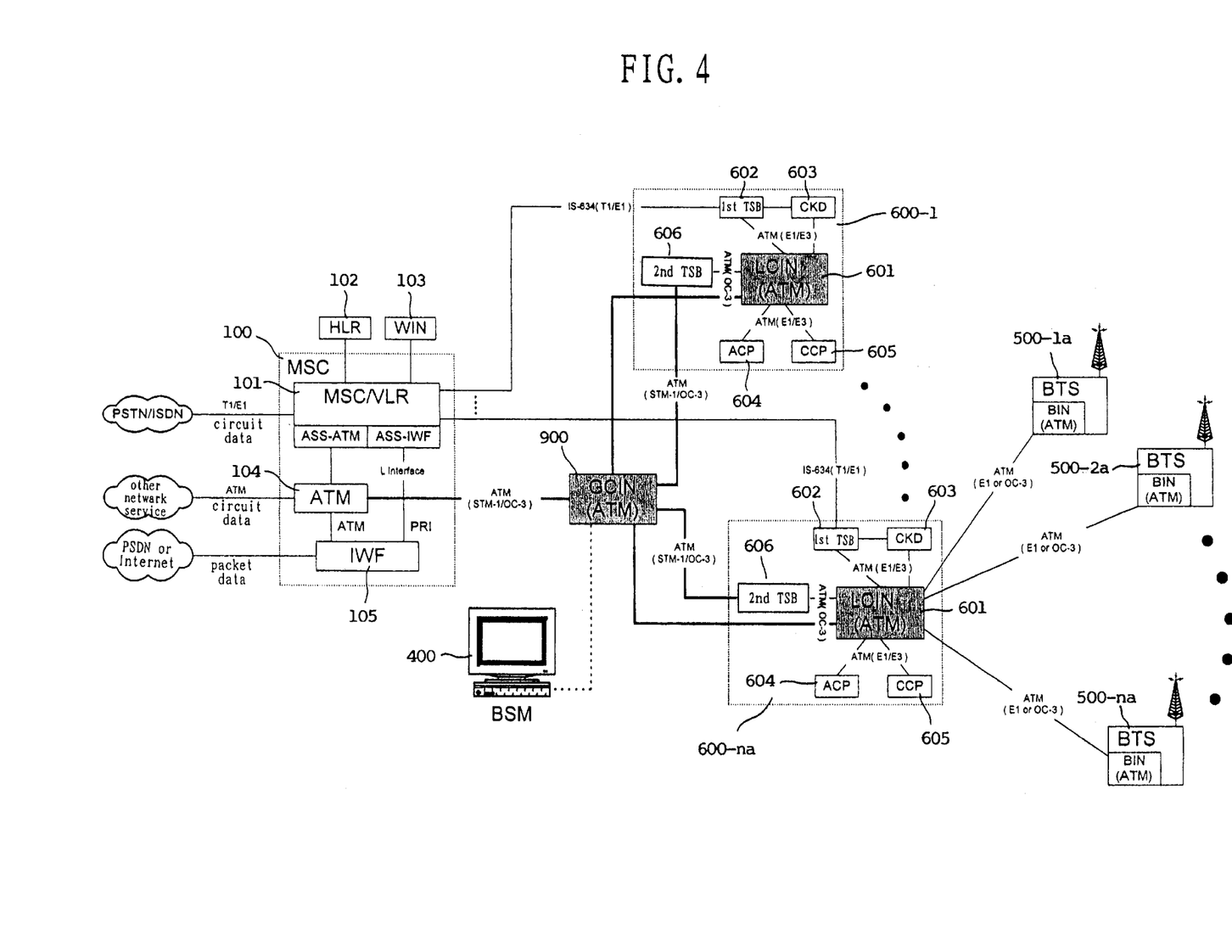
FIG. 4 is a block diagram illustrating an apparatus for processing high-speed packet data according to the third embodiment of the present invention.

FIG. 4 is a block diagram illustrating an apparatus for processing high-speed data in IS-2000 system according to the third embodiment of the present invention.

Referring to FIG. 4, the apparatus for processing high-speed data in IS-2000 system according to the third embodiment of the present invention performs soft handoff among BSCs 600-1 to 600-n by connecting the ATM switch 104 and the LCIN 601 of the second embodiment of the present invention. Here, a GCIN (ATM) 900 connected to the second TSB 606 so as to process high-speed data replaces the GCIN (ATM) 300 of the second embodiment of the present invention.

Other components of the third embodiment of the present invention are structured similarly to that of the second embodiment, and the same reference numerals are used. Therefore, detailed description thereof will be omitted.

The apparatus for processing high-speed data in IS-2000 system according to the first and second embodiments of the present invention have the GCIN 300 which only performs soft handoff among BSCs while the apparatus for processing high-speed data in IS-2000 system according to the third embodiment of the present invention has the GCIN 900 which performs a high-speed data processing in addition to soft handoff among BSCs.

The apparatus for processing high-speed data in IS-2000 system according to the first and second embodiments of the present invention have disadvantage in that the number of ports to be provided by the LCIN increases, and advantage in that the routing capacity loaded to the GCIN decreases.

The apparatus for processing high-speed data in IS-2000 system according to the third embodiment of the present invention has disadvantage in that an additional capacity is needed because the GCIN 900 performs a high-speed data service, and advantage in that the number of ports of the LCIN 601 decreases and a communication with the ATM switch 104 becomes convenient.

Figure 5:
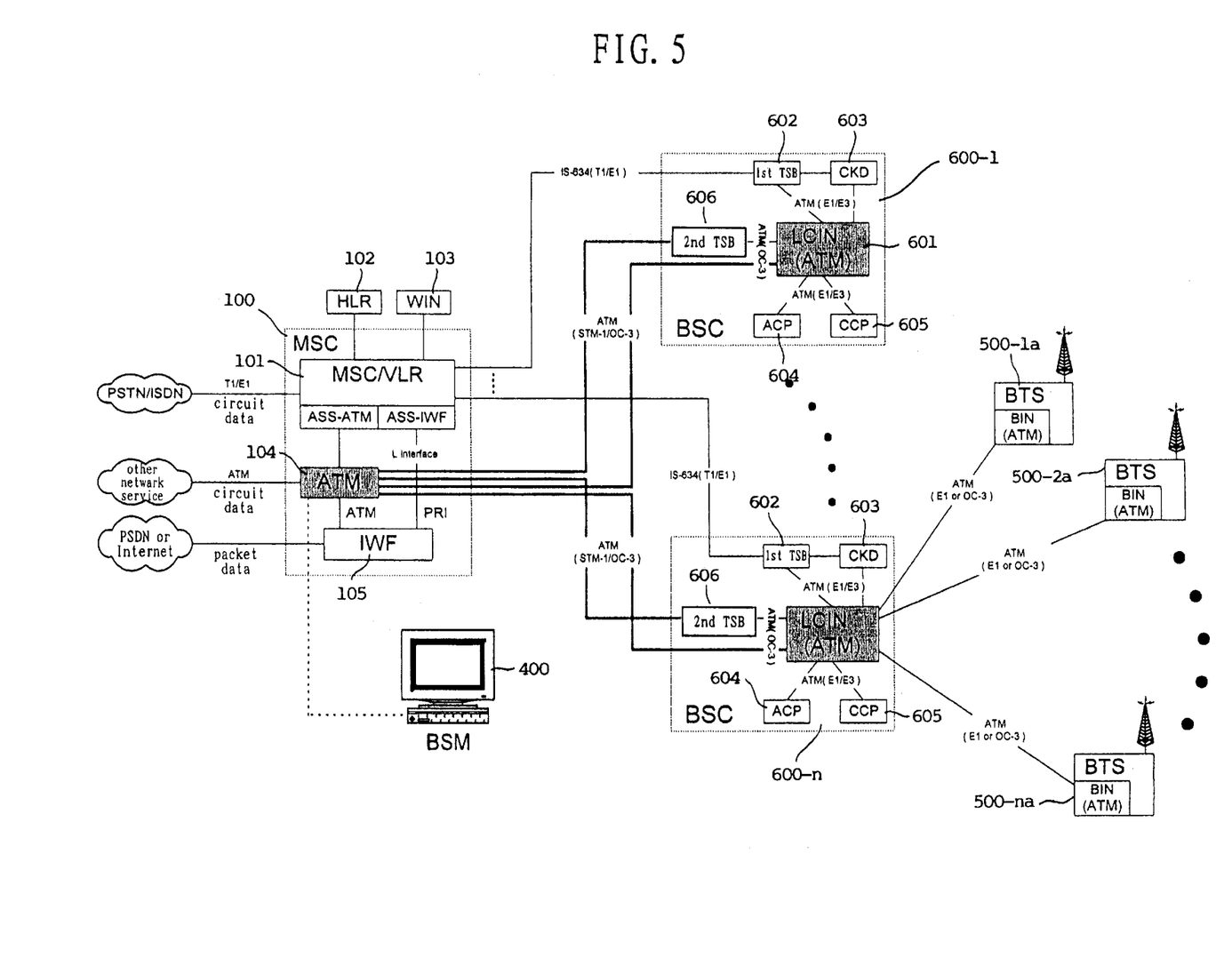
FIG. 5 is a block diagram illustrating an apparatus for processing high-speed packet data when a GCIN performs soft handoff among. BSCs and high-speed data service according to the fourth embodiment of the present invention.

FIG. 5 is a block diagram illustrating an apparatus for processing high-speed data in IS-2000 system according to the fourth embodiment of the present invention.

Referring to FIG. 5, the apparatus for processing high-speed data in IS-2000 system according to the fourth embodiment of the present invention has a configuration in that the GCIN (ATM) 900 of the third embodiment is eliminated, the ATM switch 104, LCIN 601, and the second TSB 606 are directly connected, and the BSM 400 is connected to the ATM switch 104.

In the apparatus for processing high-speed data in IS-2000 system according to the fourth embodiment of the present invention, the GCIN 900 of the third embodiment is eliminated, and the ATM switch 104 replaces it. At this time, an additional capacity is required for the ATM switch 104 since it functions as the GCIN 900. However, the elimination of the GCIN 900 results in a reduction of capacity.

A problem is that the BSM 400 is connected to the ATM switch 104 since the GCIN 900 is eliminated.

Figure 6:
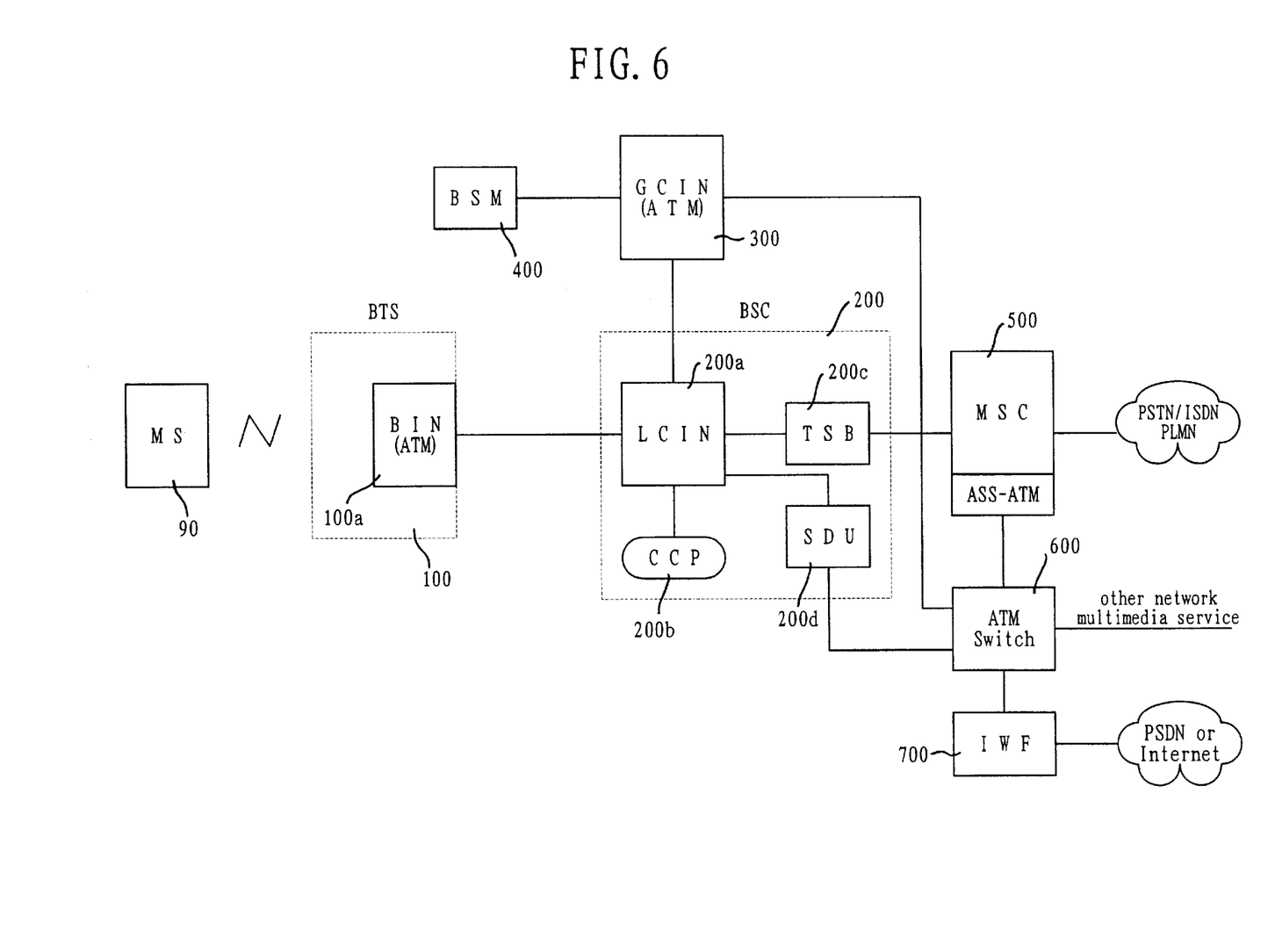
FIG. 6 is a block diagram illustrating an apparatus for processing low-speed circuit data and high-speed packet data according to the fifth embodiment of the present invention.
Figure 7:
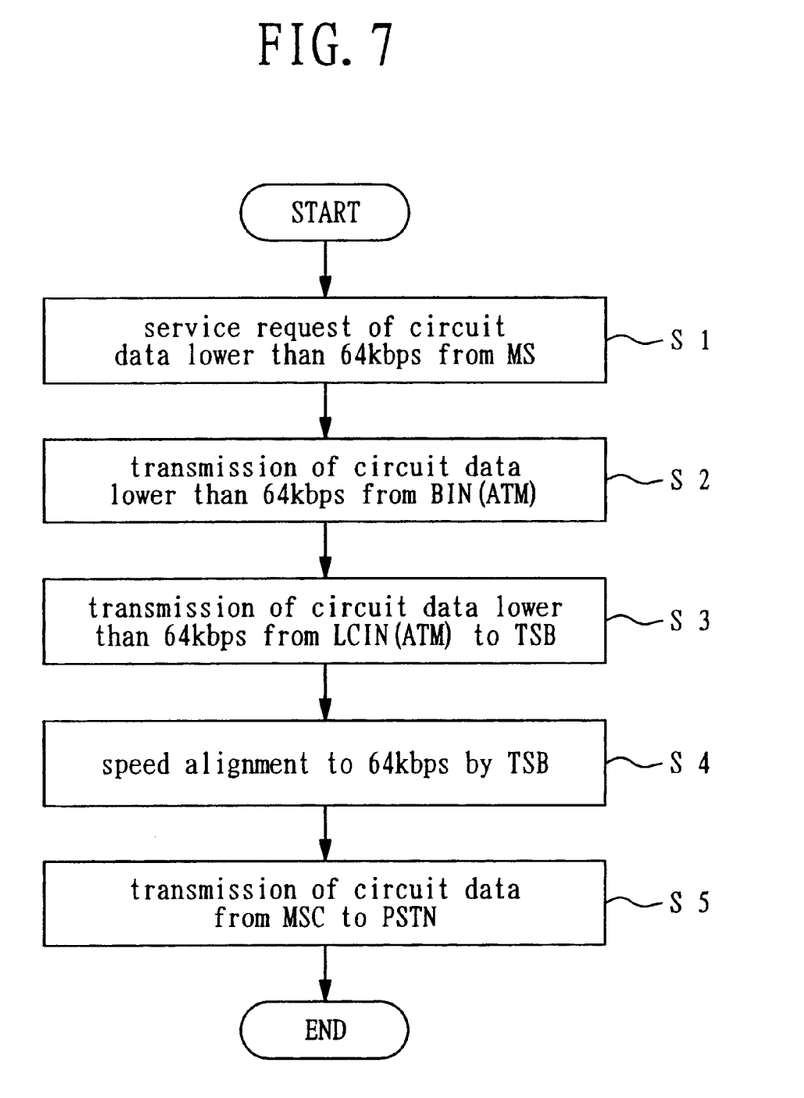
FIG. 7 is a flowchart illustrating a method of processing low-speed circuit data according to the sixth embodiment of the present invention.
Figure 8:
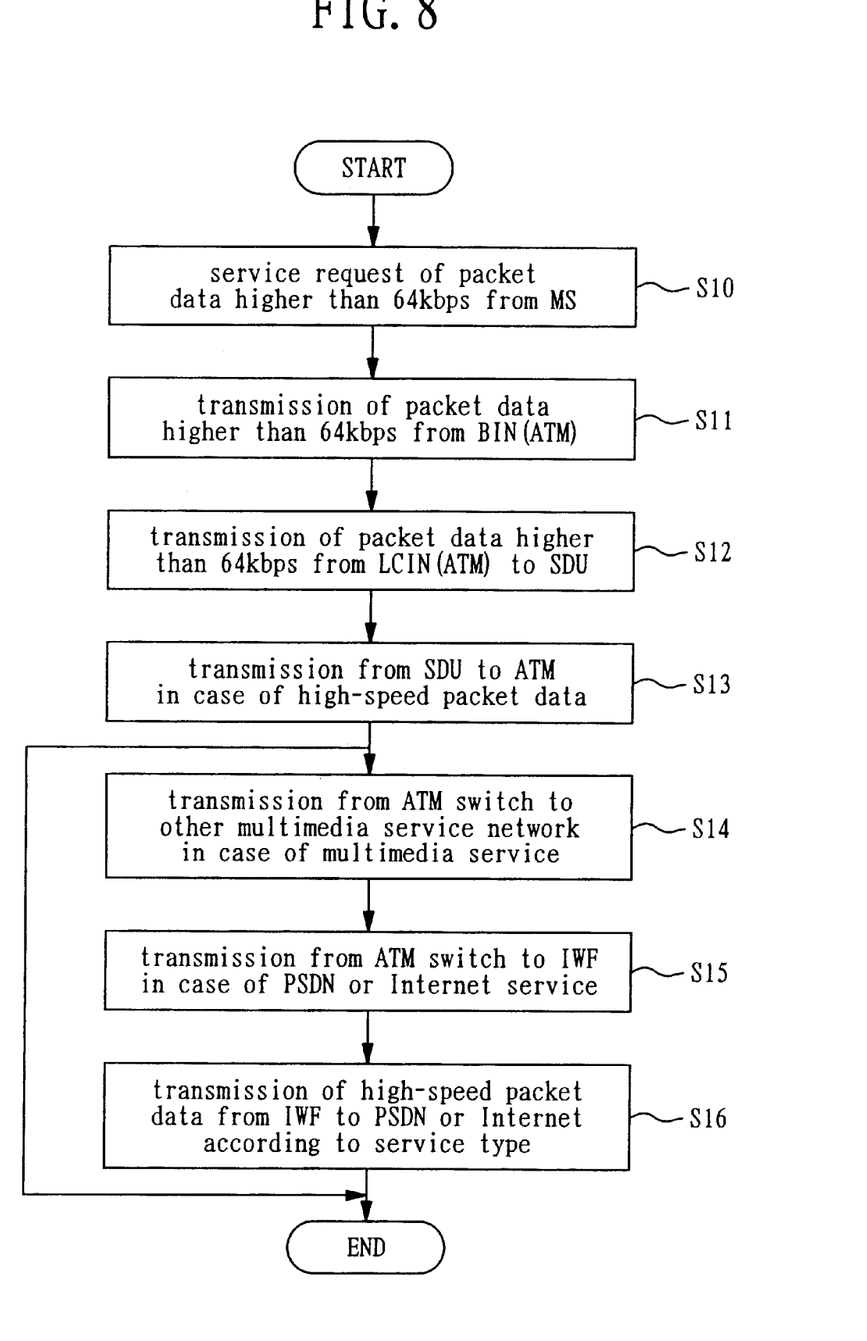
FIG. 8 is a flowchart illustrating a method of processing high-speed data according to the seventh embodiment of the present invention.
Figure 9:
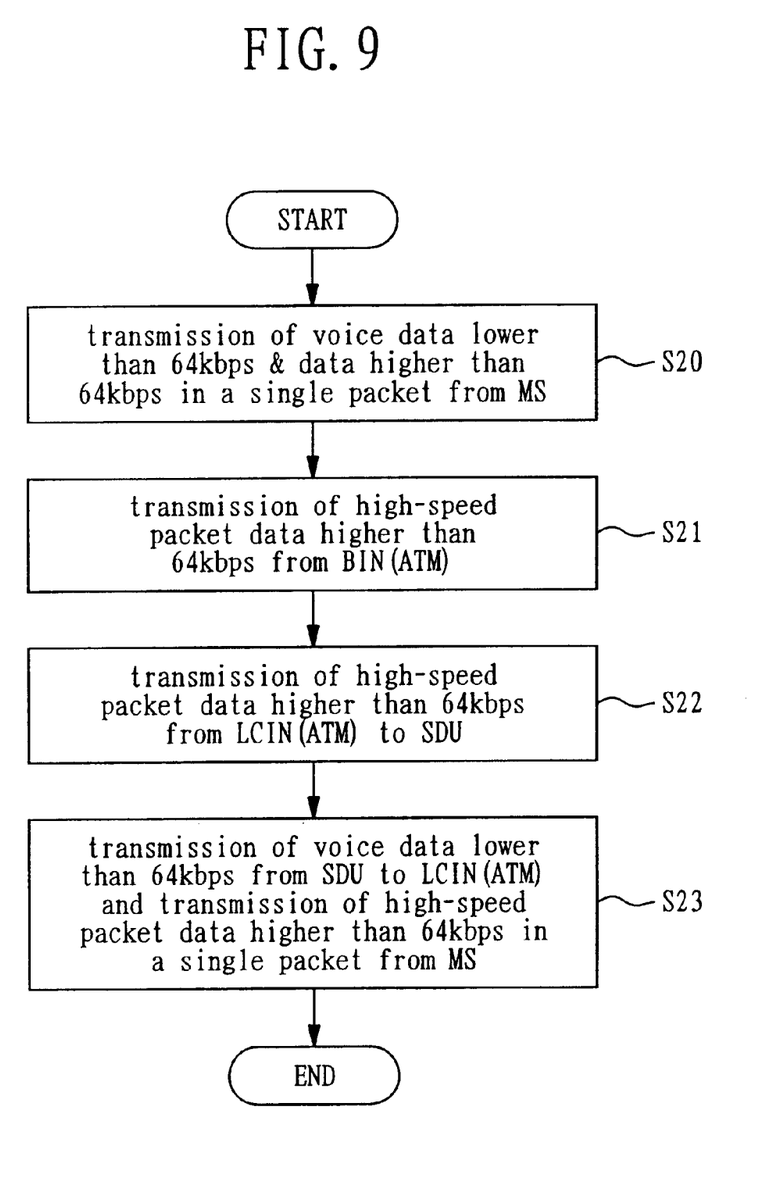
FIG. 9 is a flowchart illustrating a method of processing high-speed data made up of voice and other data according to the eighth embodiment of the present invention.

FIG. 6 is a block diagram illustrating an apparatus for processing low-speed circuit data and high-speed packet data according to the fifth embodiment of the present invention. FIG. 7 is a flowchart illustrating a method of processing low-speed circuit data according to the sixth embodiment of the present invention. FIG. 8 is a flowchart illustrating a method of processing high-speed data according to the seventh embodiment of the present invention. FIG. 9 is a flowchart illustrating a method of processing high-speed data made up of voice and other data according to the eighth embodiment of the present invention.

Referring to FIG. 6, the apparatus for processing low-speed circuit data and high-speed packet data according to the fifth embodiment of the present invention includes an MS 90, a BIN 100*a* adopting an ATM switching system for providing a communication path among each block in the BTS 100, an LCIN 200*a* adopting an ATM switching system for providing a communication path among each block in the BSC 200, a CCP 200*b* connected to the LCIN 200*a* so as to perform a call handling control function of the BSC 200, a TSB 200*c* for processing voice data and circuit data lower than 64 kbps, an SDU (selector distribution unit) 200*d* connected to the LCIN 200*a* so as to process high-speed packet data higher than 64 kbps for use in video service, PSDN, and Internet service, the GCIN (ATM) 300 connected to the LCIN 200*a* so as to provide a high-speed communication path among BSCs 200, the BSM 400 connected to the GCIN 300 so as to perform an operation of BSC and BTS, source management, state management, user interface and maintenance, an MSC 500 connected to the TSB 200*c* so as to function as a switch for voice data and other data of the overall system, the ATM switch 600 linked to the MSC 500 so as to provide a high-speed multimedia service with respect to other network, and the IWF 700 connected to the ATM switch 600 so as to process packet data.

This-configured apparatus for processing low-speed circuit data and high-speed packet data operates as follows.

A method of processing circuit data lower than 64 kbps will be explained in detail with reference to FIG. 7.

The MS 90 provides BIN 100*a* (ATM) in the BTS 100 with low-speed circuit data lower than 64 kbps in step S1, and the BIN 100*a* in the BTS 100 provides again the LCIN 200*a* in the BSC 200 with so-provided low-speed circuit data in step S2. The LCIN 200*a* then provides the TSB 200*c* with so-provided low-speed circuit data in step S3.

In step S4, the TSB 200*c* aligns the low-speed circuit data to 64 kbps and provides the MSC 500 with the result. In step S5, the MSC 500 sends thus-provided low-speed data of 64 kbps to a PSTN.

A method of processing image data which is packet data higher than 64 kbps will be explained in more detail with reference to FIG. 8.

The MS 90 provides the BIN 100*a* in BTS 100 with image data in step S10, and the BIN 100*a* provides the LCIN 200*a* in the BSC 200 with so-provided image data in step S11.

In step S12, the LCIN 200*a* provides the SDU 200*d* with the image data according to a path determined by a service option when a call is set. In step S13, the SDU 200*d* processes the provided image data, and provides the ATM switch 600 with the processed data according to a path determined by the service option when the call is set.

Here, the SDU 200*d* may not require speed alignment function which is needed when the TSB 200*c* sends circuit data lower than 64 kbps to the MSC 500. The SDU 200*d* sends the above-mentioned image data to the ATM switch 600 with no change, and performs a power control function for thus-sent image data.

In step S14, the ATM switch 600 provides an ATM switch of other network with image data in case of multimedia service where the image data is transmitted to other network. The image data is transmitted to the SDU 200*d* and to a terminal of the corresponding subscriber via the LCIN 200*a* and BIN 100*a* in case where the image data is transmitted to a subscriber of own network.

A method of processing packet data higher than 64 kbps for use in a PSDN or Internet will be explained in more detail with reference to FIG. 8.

After the above-described steps S10 to S13 are performed, thus-provided packet data is provided to the IWF 700 by the ATM switch 600 in case where the packet data is for use in a PSDN or Internet service, in step S15.

In step S16, the IWF 700 transmits thus-provided packet data to a PSDN or Internet in accordance with service type.

A method of processing packet data made up of voice data and other data will be explained in more detail with reference to FIG. 9.

The MS 90 transmits voice data lower than 64 kbps and data higher than 64 kbps as single packet data to the BIN 100*a* in step 520, and the BIN 100*a* provides the LCIN 200*a* with so-provided packet data in step S21.

In step S22, the LCIN 200a transmits thus-provided packet data higher than 64 kbps to the SDU 200d according to a path determined by a service option when a call is set.

In step S23, the SDU 200d divides thus-transmitted packet data into voice data and other data. The voice data lower than 64 kbps is transmitted, via the LCIN 200a, to the TSB 200c for processing voice data, and the data higher than 64 kbps is directly transmitted to the ATM switch 600.

As described above, the present invention is advantageous in that the TSB for processing voice data and low-speed data lower than 64 kbps and high-speed data higher than 64 kbps, or the TSB for processing high-speed data higher than 64 kbps is provided to the BSC, thus allowing high-speed data processing up to 2 mbps, high-speed data service, multimedia service like a video service, and high-speed Internet service.

In addition, the present invention is advantageous in that the LCIN and GCIN are converted to ATM switches, respectively, for processing high-speed data, thus overcoming capacity restrict in the LCIN and GCIN.

Further, the LCIN is converted to an ATM switch for processing high-speed data so that the communication among blocks in the BSC accords to an ATM switching system. Thus, the communication among BSCs complies with IS-634 standard, enabling soft handoff between other BSC.

The present invention has an advantage in that a conventional network construction for supporting voice data and other data lower than 64 kbps is used as it is and only a new SDU for processing high-speed packet data is added. Thus, cost for data system network development can be curtailed by reducing development personnel and time.

In addition, new IS-2000 service, for example, video service for data higher than 64 kbps, PSDN service, or Internet service may be provided, maintaining data service (IS-95/A/B) provided by a conventional CDMA system.

The present invention allows new IS-2000 service only by modifying an MSC of a conventional CDMA system.

What is claimed is:

1. An apparatus for processing high-speed data comprising:
  a BIN adopting an ATM switching system for providing a high-speed communication path among each block in each BTS;
  an LCIN adopting an ATM switching system connected to said BIN so as to provide a high-speed communication path among each block in each BSC;
  a first TSB connected to said LCIN so as to process voice data and low-speed data lower than 64 kbps;
  a second TSB connected to said LCIN so as to process high-speed data higher than 64 kbps;
  a GCIN adopting an ATM switching system connected to said LCIN so as to provide a high-speed communication path among each BSC;
  a BSM connected to said GCIN so as to perform an overall operation of said BSC and BTS, source management, state management, user interface and maintenance;
  an MSC connected to said first TSB so as to function as a switch for voice data and other data of an overall system;
  an ATM switch connected to said MSC so as to provide a high-speed multimedia service with respect to other network; and
  an IWF connected to said ATM switch so as to process packet data.

2. An apparatus for processing high-speed data comprising;
  a BIN adopting an ATM switching system for providing a high-speed communication patch among each block in each BTS;
  an LCIN adopting an ATM switching system connected to said BIN so as to provide a high-speed communication path among each block in each BSC;
  a first TSB connected to said LCIN so as to process voice data and low-speed data lower than 64 kbps;
  a second TSB connected to said LCIN so as to process high-speed data higher than 64 kbps;
  a GCIN adopting an ATM switching system connected to an ATM switch and said LCIN so as to perform soft handoff among each BSC and which is connected to said second TSB so as to process high-speed data;
  a BSM connected to said GCIN so as to perform an overall operation of said BSC and BTS, source management, state management, user interface and maintenance;
  an MSC connected to said first TSB so as to function as a switch for voice data and other data of an overall system;
  an ATM switch connected to said MSC so as to provide a high-speed multimedia service with respect to other network; and
  an IWF connected to said ATM switch so as to process packet data.

* * * * *